United States Patent [19]
Saito

[11] Patent Number: 5,631,699
[45] Date of Patent: May 20, 1997

[54] VIDEO CAMERA SYSTEM FOR USE IN FIXED AND FREE MODES IN WHICH, WHEN COUPLED TO A BASE IN THE FIXED MODE, VIDEO FUNCTIONS ARE AUTOMATICALLY SET BY A CONTROL

[75] Inventor: Masashi Saito, Hachioji, Japan

[73] Assignee: Konica Corporation, Japan

[21] Appl. No.: 384,619

[22] Filed: Feb. 6, 1995

Related U.S. Application Data

[63] Continuation of Ser. No. 136,457, Oct. 13, 1993, abandoned.

[30] Foreign Application Priority Data

Oct. 22, 1992 [JP] Japan .................. 4-073791 U
Jun. 25, 1993 [JP] Japan .................. 5-155269

[51] Int. Cl.[6] .................................................. H04N 5/232
[52] U.S. Cl. .................... 348/213; 348/143; 348/221; 348/373; 348/655; 358/479
[58] Field of Search ............... 348/14–23, 110, 348/230, 296, 297, 208, 362, 373, 221, 225, 227, 211, 213, 143, 153, 655, 602, 603; 355/18, 39, 40, 41; 358/479; H04N 5/232

[56] References Cited

U.S. PATENT DOCUMENTS

| | | | |
|---|---|---|---|
| 4,364,650 | 12/1982 | Terashita et al. | 354/31 |
| 4,506,290 | 3/1985 | Hashimoto | 348/225 |
| 4,578,708 | 3/1986 | Munnion | 358/229 |
| 4,653,709 | 3/1987 | Paldino | 248/183 |
| 4,809,076 | 2/1989 | Todaka et al. | 348/230 |
| 4,858,003 | 8/1989 | Wirt et al. | 348/110 |
| 4,864,409 | 9/1989 | Platte | 358/222 |
| 4,928,300 | 5/1990 | Ogawa et al. | 348/14 |
| 5,012,347 | 4/1991 | Fournier | 358/222 |
| 5,077,784 | 12/1991 | Fujita et al. | 348/14 |
| 5,121,147 | 6/1992 | Wada | 354/81 |
| 5,170,427 | 12/1992 | Guichard et al. | 348/14 |
| 5,227,889 | 7/1993 | Yoneyama et al. | 348/208 |
| 5,285,226 | 2/1994 | Frosig | 354/81 |
| 5,293,242 | 3/1994 | Mamiya | 348/362 |

*Primary Examiner*—Wendy Garber
*Assistant Examiner*—Andrew B. Christensen
*Attorney, Agent, or Firm*—Jordan B. Bierman; Bierman, Muserlian and Lucas LLP

[57] ABSTRACT

A video camera system for recording an image of an subject. The video camera system includes; a video camera body for recording the image of the subject; a supporting base for supporting a coupling member; the coupling member for coupling the video camera with the supporting base so that the video camera is mounted on the supporting base, and for releasing the video camera from the supporting base; and a controller for setting functions of the video camera, such as the exposure level, the focusing point adjustment mode, the angle of view, the white balance, and the automatic gain control level, to record the image of the subject within a predetermined focal range when the video camera is mounted on the supporting base.

6 Claims, 10 Drawing Sheets

VIDEO CAMERA SYSTEM FOR USE IN FIXED AND FREE MODES IN WHICH, WHEN COUPLED TO A BASE IN THE FIXED MODE, VIDEO FUNCTIONS ARE AUTOMATICALLY SET BY A CONTROL

This application is a continuation of application Ser. No. 08/136,457, filed Oct. 13, 1993, now abandoned.

BACKGROUND OF THE INVENTION

The present invention relates to a method for use of a stationary compact video camera which is used for a visual telephone or the like.

Recently, the size of a video camera has been remarkably reduced and its cost has been remarkably lowered, in addition to the increase of functions and performance, and the video camera has been spreading and used in various fields as an image transmission and recording means.

Among various video cameras, a stationary compact type video camera has remarkably wide fields for use in the near future as a means for photographing a human image in a visual telephone, a means for information transmission for industry or traffic, or an observation and recording means of ecology of animals and plants.

An object of the stationary type video camera is, intrinsically, to take a photograph of a subject positioned at a specified distance. Accordingly, in many cases, an exclusive base for the video camera is provided, and the video camera is used under the condition that it is fixed to the base.

However, recently, even in the stationary type video camera, it has highly advanced functions in which photographing for a distant view and a close-range view, and further, even close-up photographing can be carried out, and the video camera can be widely used for general purposes in addition to the foregoing uses.

However, in the case where this type of video camera is used for close-up photographing, or out-door photographing, when it is fixed to the base, it is inconvenient because a photographing attitude can not be freely taken for this type of video camera as compared with a general purpose handy type video camera and its functions can not be fully used.

Inversely, in the handy type video camera, it is not its object that it is provided on a mount or a table, and accordingly, it is not suitable for the field of use of the present invention.

Further, in the video camera for general purpose use, only two types of control functions of automatic and manual controls are provided for various control functions such as an exposure level of an image pick-up element, focusing point control of a picture taking lens, an image magnification ratio of a picture taking lens, white balance, an AGC level or the like (hereinafter, called various control functions).

Automatic control has the limit to its own corresponding performance. Although manual control can conduct fine control, it is necessary to adjust its setting every time when a position of the video camera is changed.

The object of the present invention is to solve the foregoing problems and to provide a stationary type video camera which can be easily operated and used for general purpose photographing in the same manner as the handy type video camera, and can easily provide optimum settings for various control functions and which can be easily operated, for each camera position in the field of use as described above.

SUMMARY OF THE INVENTION

The foregoing object can be accomplished by the following: a stationary type video camera which is placed on an exclusive mount for use, and which is used under the fixed condition on the mount when a subject positioned at a specified intermediate distance is photographed, and which can be used under the separated condition from the mount when a subject positioned at a long distance or short distance is photographed (a first example); a stationary type video camera which is placed on an exclusive mount or table for close-up photography for use and can be used under the separated condition from the mount or table for close-up photography, wherein a setting value of at least one of an exposure level of the image pick-up element, focus adjustment of a picture taking lens, an image magnification ratio of the picture taking lens, a white balance, and an AGC level can be automatically switched depending on each of cases where the video camera is placed on the exclusive mount, it is placed on the table for close-up photography, or it is used under the separated condition from the mount or table (a second example); and a stationary type video camera which is placed on the exclusive mount or table for close-up photography for use, wherein a battery accommodated in the video camera is charged, that is, the video camera is cordless, when it is placed on the exclusive mount or table for close-up photography (a third example).

DETAILED DESCRIPTION OF THE INVENTION

A first example of the present invention is shown in FIG. 1, FIG. 2, FIG. 3 and FIG. 4.

Figure 1:
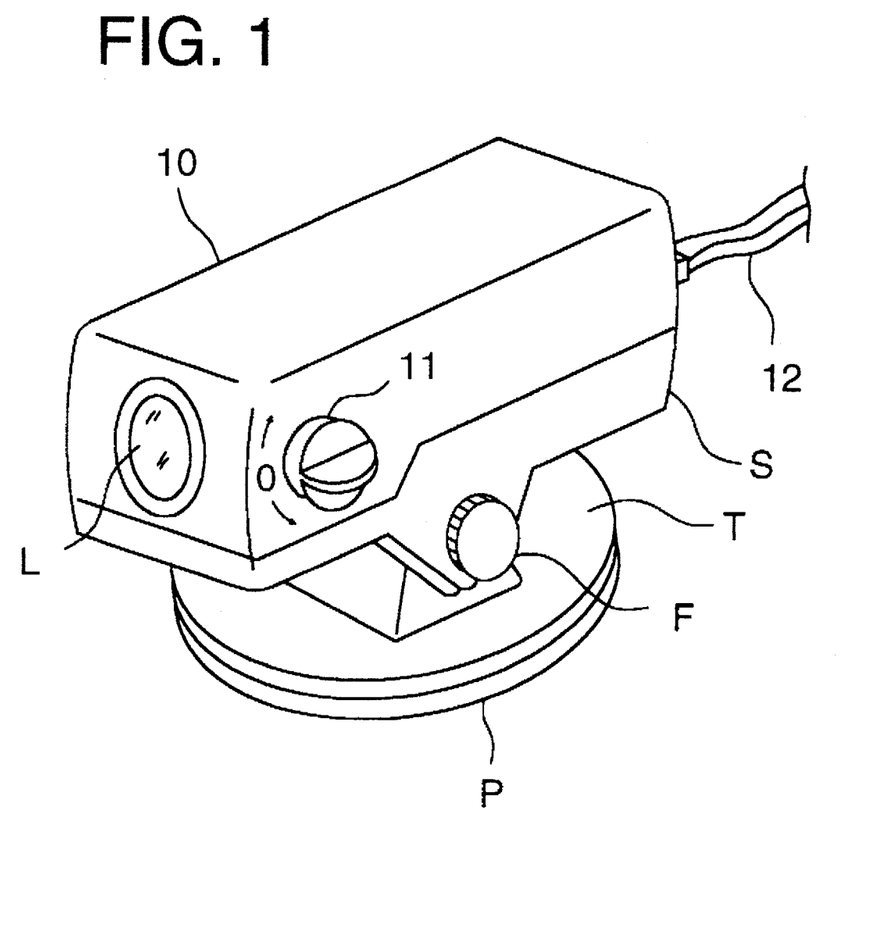
FIG. 1 is a perspective view showing a video camera which is placed on a mount.

Numeral 10 is a stationary compact type video camera used for a visual telephone. When an adjusting knob 11 is rotated, a focal position of a picture taking lens L can be switched for an intermediate distance, for a long distance, and for a short distance.

P is an exclusive mount by which the video camera 10 is supported and placed in a predetermined position. As shown in the drawing, it is placed on a television and used under the condition that the camera 10 is supported.

The mount P is provided with a movable supporting base S on a rotational table T which is rotated with appropriate friction. With respect to the camera 10 mounted in the supporting base S, its position in the horizontal direction is shifted by the rotation of the table T, and its vertical position is shifted by a swing and tilt operation of the supporting base S, and the camera 10 is fixed when a clamp knob F is fastened.

Figure 2:
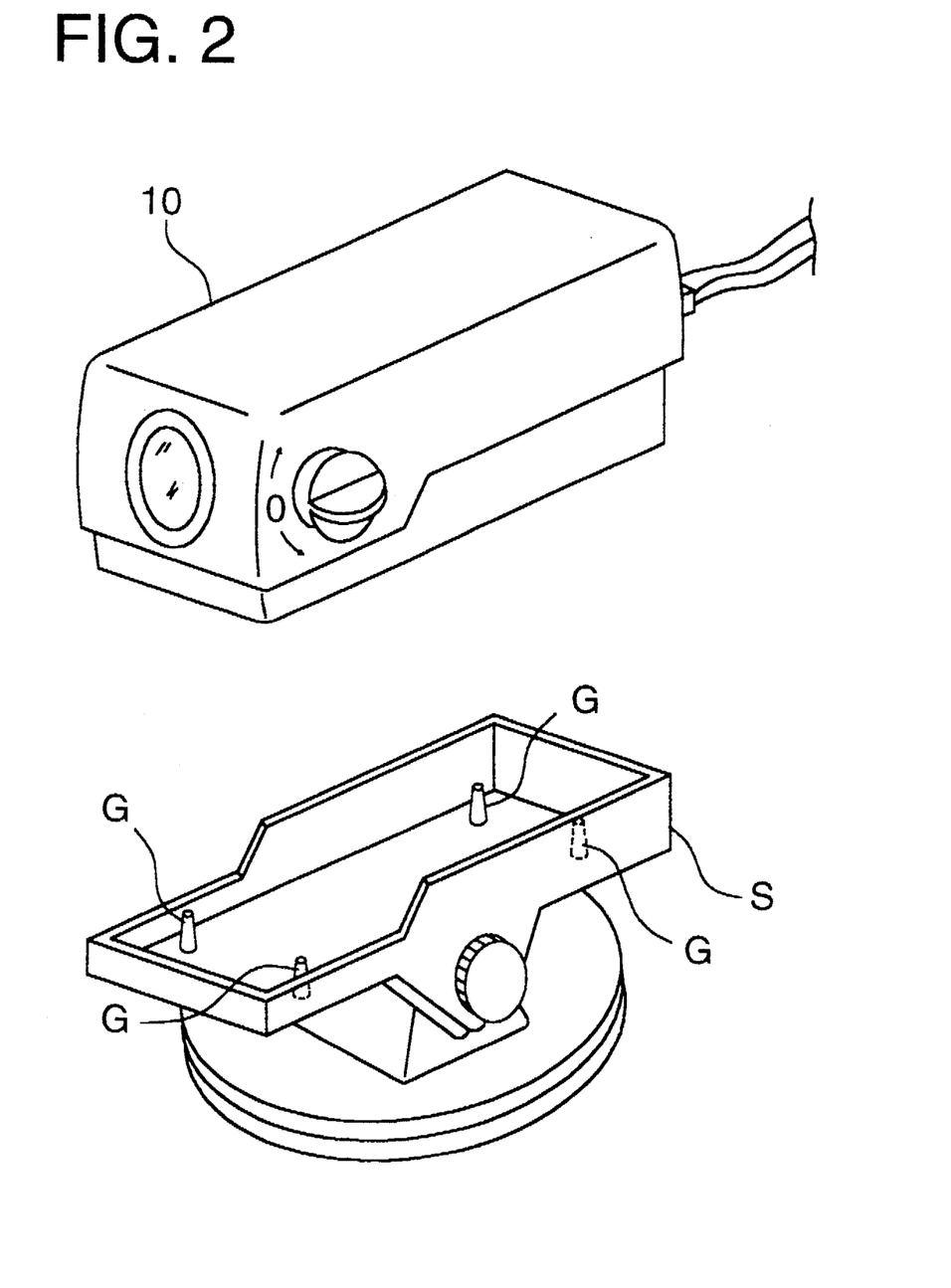
FIG. 2 is a perspective view showing the video camera which is separated from the mount.
Figure 3:
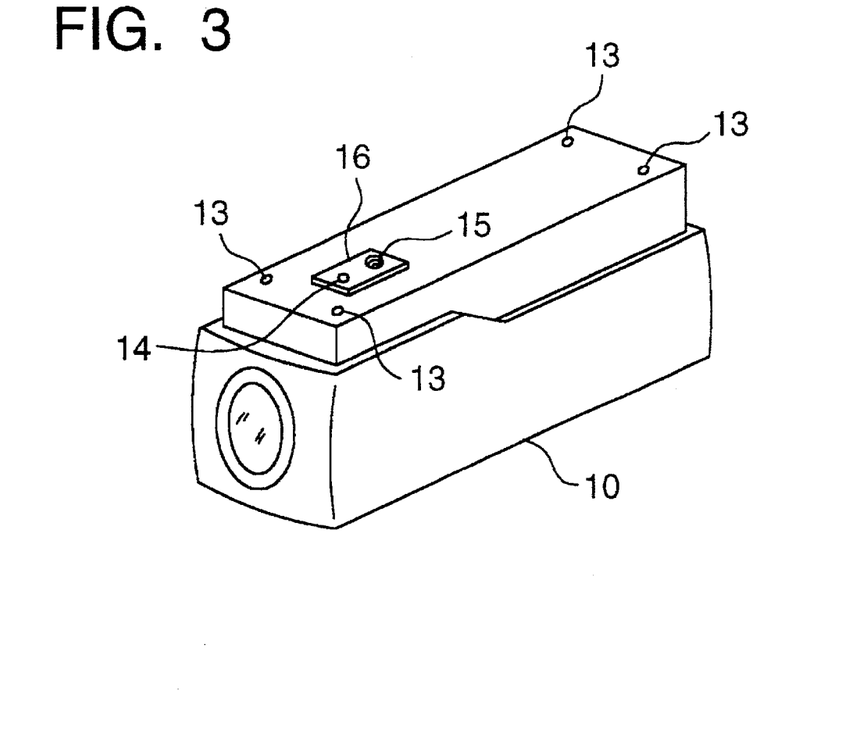
FIG. 3 is a perspective view showing a bottom surface of the video camera.

Four tapered guide pins G are protruded in the base portion of the supporting base S as shown in FIG. 2, and four tapered guide holes 13 are provided in the base surface of the camera 10 as shown in FIG. 3. When these guide holes 13 are engaged with guide pins G, the camera 10 is placed in the supporting base S and positioned therein.

Figure 4:
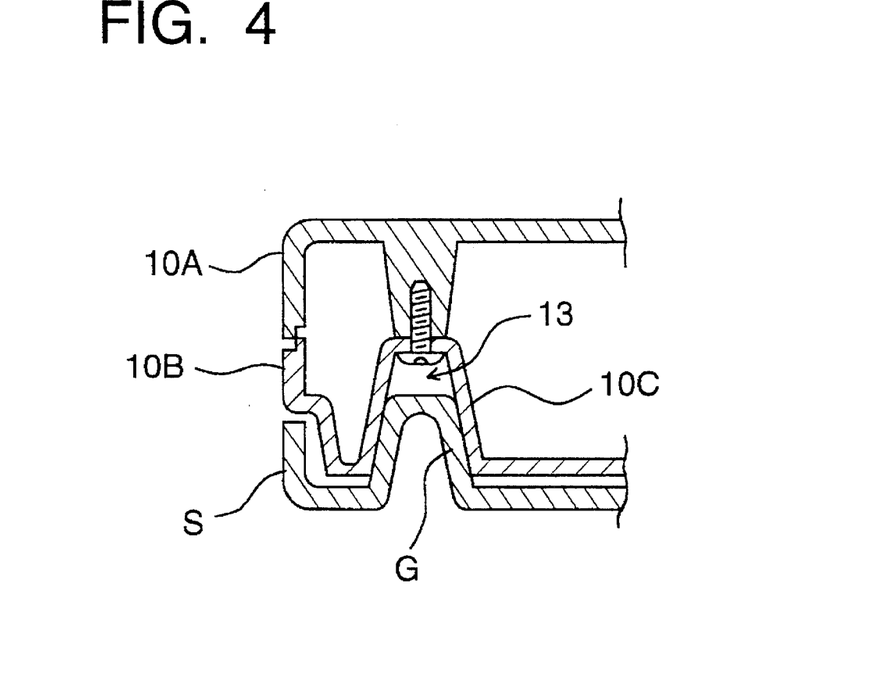
FIG. 4 is a sectional view of a main portion of a video camera supporting base.

Guide holes 13 can be formed by utilizing the wall thickness of each of protrusions 10C of a lower main body 10B, in which the protrusions 10C are provided in order to combine an upper main body 10A of the camera 10 with the lower main body 10B as shown in FIG. 4. When those holes are formed as described above, a head of a screw to combine the upper main body 10A with the lower main body 10B is located at a position lower than the the horizontal surface. Accordingly, when the camera 10 is separated and supported, the head of the screw is not touched with the hand. Although four guide pins G are used in the example, it is not necessary that the number of the guide pins are limited to this example.

Accordingly, a power cord 12 is directly connected with the camera 10 irrespective of the supporting base S. Therefore, the camera 10 can be easily placed in a predetermined position of the supporting base S, that is the mount P, or can be easily detached from the mount for photographing. As a result, when the foregoing switching functions of the focal position are used, the camera 10 can be used as a general purpose handy type video camera in addition to the visual telephone.

Further, when the camera 10 is provided with a mounting plate 16 having a rotation-stop hole 14 and a tripod screw hole 15, the camera can be mounted on a tripod so that photographing in a close-up distance can be carried out.

Next, a second example of the present invention will be explained referring to FIG. 5, FIG. 6, FIG. 7, FIG. 8, and FIG. 9.

As a video camera 10 according to the second example, a camera is used in which a zoom lens with an automatic focus point adjusting function (AF) is used for a picture taking lens L, and further, an automatic exposure adjusting function (AE) and an automatic magnification function are provided, and white balance and an AGC level can be automatically switched.

The video camera 10 is used in the manner that it is placed in the mount P, and in addition to that, the camera 10 is used for photographing of documents in the manner that it is placed on the table for close-up photography.

Figure 5:
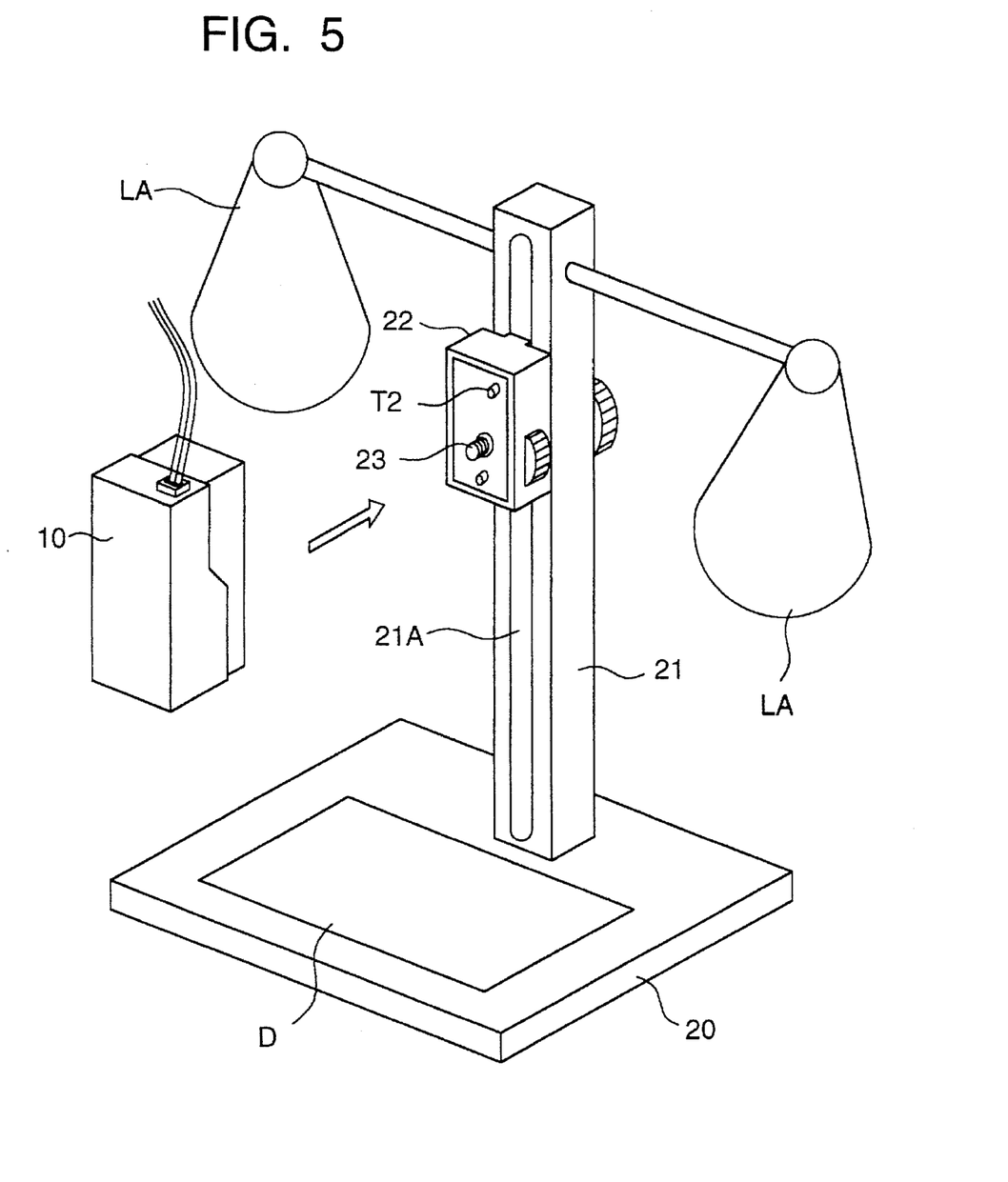
FIG. 5 is a perspective view showing an outside view of a table for close-up photography.

The camera 10 is fixed on a mounting base 22, which is slidably supported by a vertical column 21 of the table for close-up photography, through a tripod screw 23, and when the mounting base 22 is vertically moved along a guide groove 21A provided in the column 21, the photographic distance to the document D is set and a light LA is illuminated so that close-up photographing can be carried out.

Photographing conditions of the camera 10 can be automatically switched depending on the following conditions: the camera 10 is used under the condition that it is placed on the mount P, or on the table for close-up photography; or the camera 10 is independently used under the condition that it is separated from the mount and the table.

Figure 6:
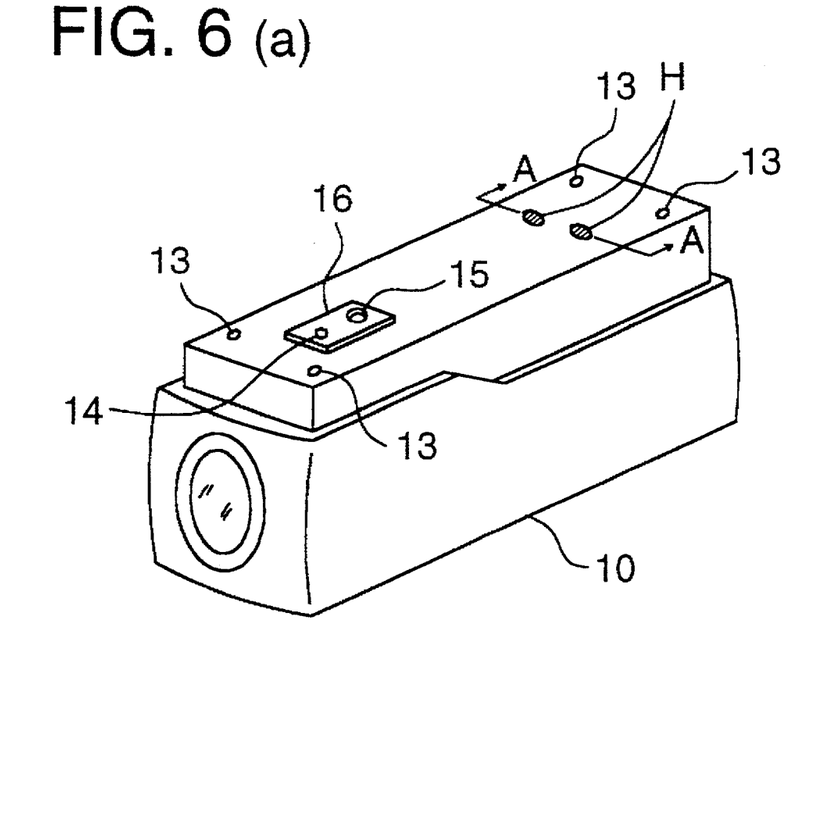
FIG. 6 is an illustration of a main portion of the video camera.
Figure 7:
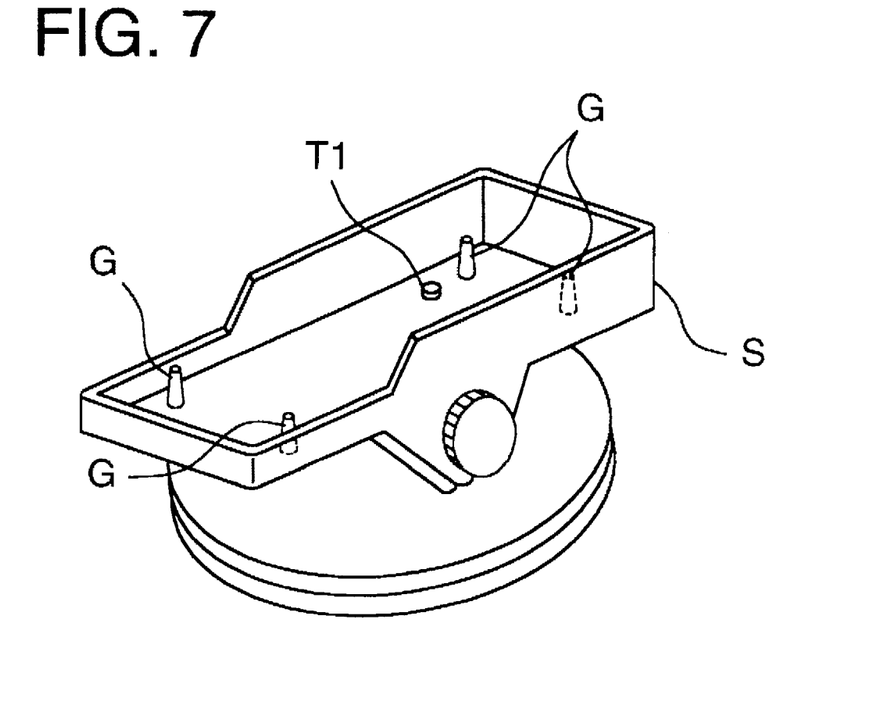
FIG. 7 is an illustration of a main portion of the mount.

FIG. 6 and FIG. 7 shows the main portions characterized in the camera 10 according to the second example. In the drawings, portions common to the video camera 10 according to the first example are denoted with common symbols and numerals.

The camera 10 is provided with a pair of through holes H in the base surface, and a pair of switches SW are provided inside the holes as shown in FIG. 6(b) which is a sectional view taken on line A—A in FIG. 6(a).

The supporting base S of the mount P is provided with a protrusion pin T1 inside the base surface portion of the supporting base S, and the mounting base 22 of the table for close-up photography 20 is provided with a protrusion pin T2 in the front portion of the mounting base 22.

Positions of the protrusion pins T1 and T2 are different, and T1 and T2 respectively push different switches SW in order to turn them ON when the protrusion pins respectively pass through different through holes provided in the base portion of the camera 10.

Accordingly, photographing conditions of the camera 10 can be automatically switched depending on the following conditions: which switch is turned ON; or whether both switches are OFF when the camera is separated from its base.

Further, when an equipment with both protrusion pins T1 and T2 is provided, both of the pair of switches SW are turned ON, and the camera 10 can be switched to a photographing function which is specified by the equipment.

The camera 10 has a switch panel which is not shown in the drawings, and controls various setting values of control functions. The setting value is decided in the following four ways:

① The setting values are selected from fixed values provided in the camera 10 in advance.

② A fixed value is selected when an independent setting switch and knob of control functions are manually operated.

③ A fixed value is selected when calibration is carried out under the condition that the camera 10 is placed in a predetermined position.

④ A variable value is selected as the setting value when functions of the camera automatically track circumferential conditions.

Figure 8:
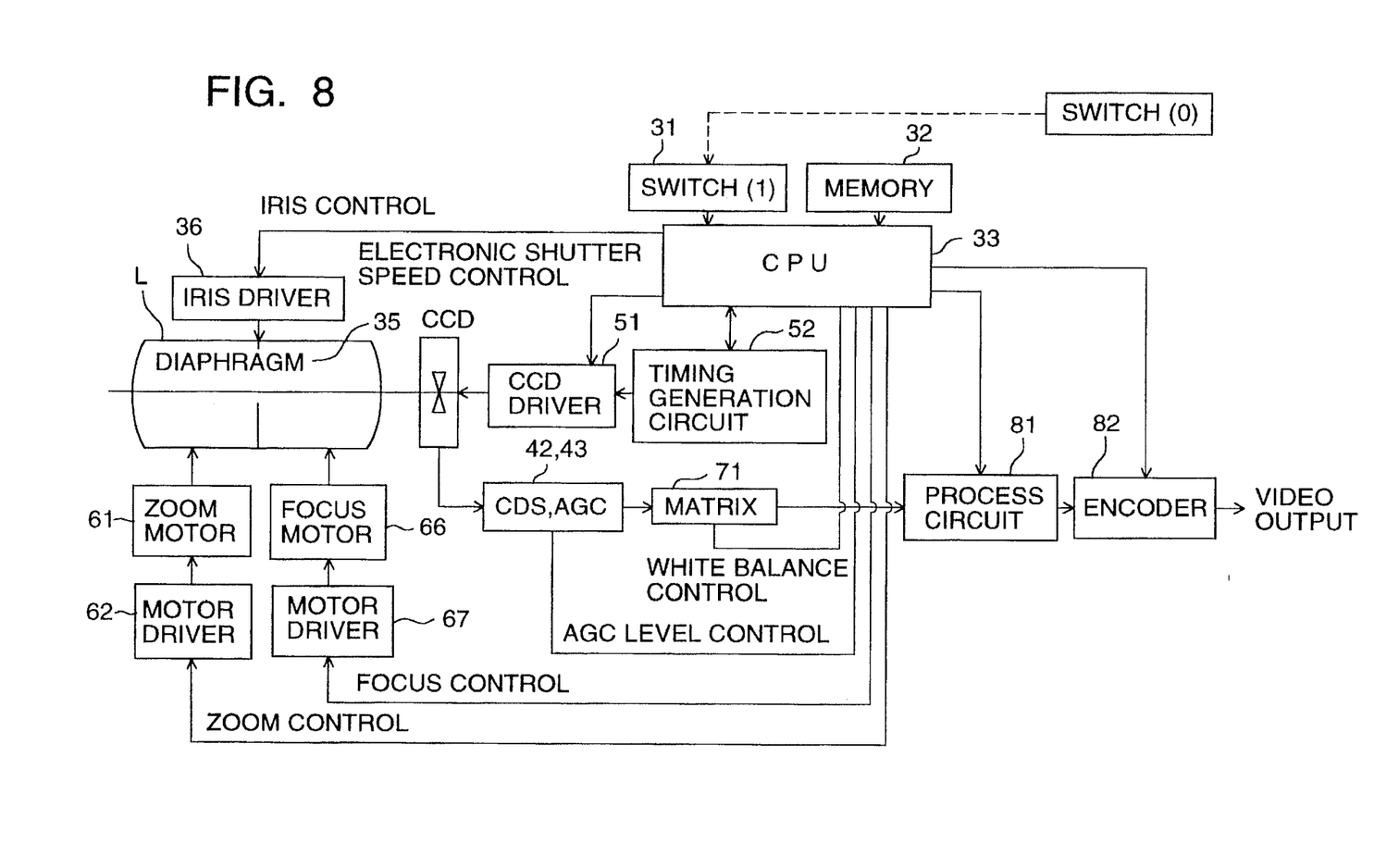
FIG. 8 is a block diagram showing the mode switching condition of photographic functions (No. 1).

Setting values thus obtained in the foregoing are written in a memory 32 for each position in the case of the structure shown in FIG. 8, and after that, setting values are automatically switched every time when positions are changed.

Next, the switching action of photographic functions according to inputting conditions of switches SW will be explained for every control function in each example as follows.

(Exposure level-1) When the camera 10 is used under the condition that it is placed in the mount P, the camera is mainly used for in-door photographing, and a rear light compensation mode is set in order to compensate an under exposure in the case of portrait photographing by a window. This mode is set when the switch SW is turned ON which is operated by pressure of the protrusion pin T1 provided in the supporting base S of the mount P, and reset when the camera 10 is separated from the mount P.

In the case of an appropriate exposure, an exposure level of a CCD is set so that an intermediate value or an average value of brightness of a subject can be included in a saturation level of the CCD by a predetermined ratio. There are two setting methods as will be described in the following: the first method is the method in which the diameter of a diaphragm 35 shown in FIG. 8 is changed by an iris control in the case where the CCD has no shutter function, or the shutter speed is a fixed value; and the second method is the method in which the shutter speed of the CCD is changed by an AES (Automatic Electronic Shutter) function in the case where the diaphragm 35 is fixed.

Accordingly, the rear light compensation can be carried out in the following manner: in the case of the first method, the diameter of the diaphragm 35 is larger than that in the case of the appropriate exposure; and in the case of the second method, the shutter speed of the CCD is lower than that in the case of the appropriate exposure. An amount of compensation can be arbitrarily set in the foregoing manner.

(Exposure level-2) When the camera 10 is mounted on the table for close-up photography 20, since the color density of the document (subject) is various, the automatic exposure is not appropriate in many cases, and therefore, a mode in which an amount of exposure can be manually decided is set. This mode is set when the switch Sw is turned ON which is operated by the pressure of the protrusion pin T2 provided in the mounting base 22 of the table for close-up photography 20. At first, the mode is switched to the setting value determined in the foregoing, and after that, the mode is set to a manual mode. Further, the camera 10 is separated from the mounting base 22, and the mode is reset and returned to the automatic exposure mode.

(Focusing point adjustment) When the camera 10 is used in the manner that it is placed in the mount P, the camera is used for photographing a portrait or a still life in many cases, and the photographing distance is approximately constant. Further, considering that the subject is out of a target for focusing, the AF function is reset, and a mode for a fixed focusing point or manual focusing point adjustment is set. This mode is set together with the foregoing rear light compensation mode when the switch SW is turned ON by the protrusion pin T1 of the mounting base S, and reset when the camera 10 is separated from the mount P, and returned to the automatic focusing mode.

Figure 11:
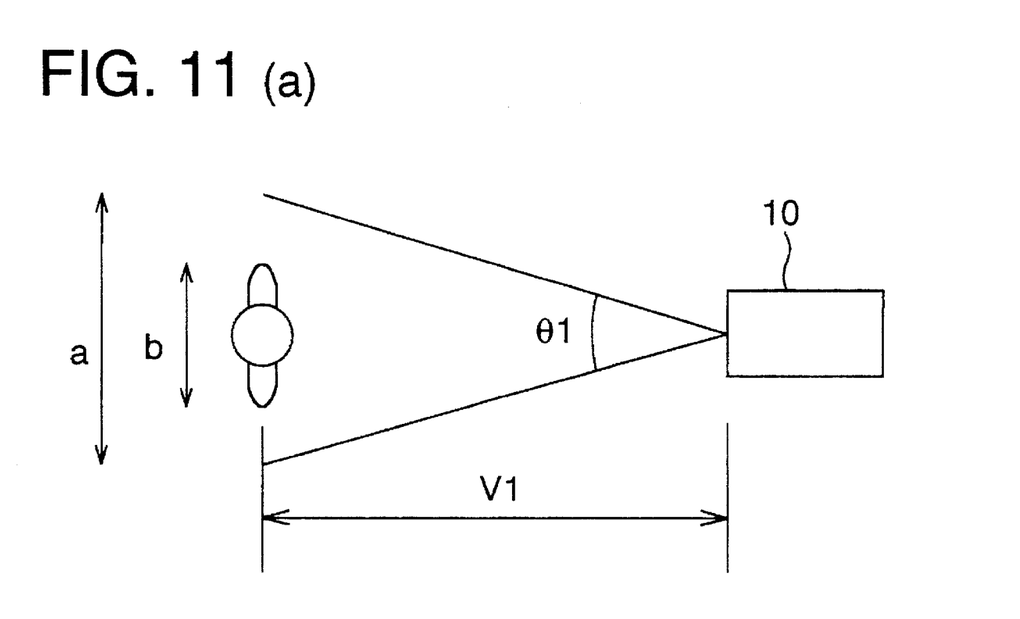
FIG. 11 is an illustration of a method by which size of a human image is made constant.

(Angle of view) Although it is preferable that the dimension of an image of the subject is approximately constant on an image plane, in the case where the angle of view is fixed, the dimension of the subject image on the image plane is changed when the distance from the camera 10 placed in the mount P to the subject is changed and the photographing distance is changed. Accordingly, when the distance from the subject is changed and the photographing distance is changed, a mode is set in which the angle of view of the picture taking lens L, that is, a zoom ratio is automatically changed according to the photographing distance, and the dimension of the subject is constant on the image plane. This mode is effective for both of an AF and a manual focusing point adjustment modes. The angle of view is preferably decided in the manner that, as shown in FIG. 11, the dimension of the subject 'b' is supposed to have some dimension, and decided according to the distance. That is, even when the subject is moved from the position shown in FIG. 11(a) to the position shown in FIG. 11(b) and the distance V is changed from V1 to V2, the angle of view $\Theta$ is changed from $\Theta 1$ to $\Theta 2$, and a ratio b/a becomes constant. The detection of the distance V can be carried out by a distance measurement sensor in the AF mode in the distance measurement system, or by an inverse operation from the result of the position detection of the lens in the AF mode in other measurement system. Further, the subject is detected by processing the image signal formed on the CCD, and the dimension of the subject may be controlled so that it becomes constant. This mode is set when the switch SW is turned ON by the protrusion pin T1 provided in the supporting base S, reset when the camera 10 is separated from the mount P and returned to a mode in which an arbitrary angle of view can be set.

(White balance) In illumination for the subject, color temperature of natural light in the out-door is greatly different from that of artificial light in the in-door. Accordingly, when the camera is provided with an automatic tracking function for white balance, the white balance corresponding to the change of the color temperature can be obtained. However, when the automatic white balance tracking function is not perfect, and the color balance of the subject is largely deflected to one side, appropriate setting values of the camera can not be obtained. When photographing is carried out using the mount P or the table for close-up photography, the color temperature of the illumination is constant, and therefore, the white balance is automatically selected and switched to the value which is set in the foregoing manner. This switching processing is selected depending on which of the protrusion pins T1 and T2 provided in the supporting base S turns the switch SW ON. The white balance is switched to a specific value which is adapted for the color temperature of the illumination provided in the mount P or the table for close-up photography 20, and reset when the camera is separated from the mount P or the table for close-up photography. After that, the function of the camera is returned to the automatic tracking function.

[AGC level (Automatic Gain Control level)] The intensity of illumination is changed depending on the case where the mount P or the table for close-up photography is used, and the case where the camera is used under the separated condition from those mount or table. When the AGC level is automatically switched to the value which is set in the foregoing manner, a video image, which has a suitable contrast and low noises, can be obtained. This switching processing is selected depending on which of the protrusion pins T1 and T2 provided in the supporting base S turns the switch SW ON, or whether both of the switches are OFF when the camera is separated from the supporting base S.

Next, a signal processing system to switch the foregoing photographic functions will be explained referring to FIG. 8.

The picture taking lens L is provided with a zoom motor 61 driven by a motor driver 62 and a group of zooming lenses, a focus motor 66 driven by a motor driver 67 and a group of focusing lens, and a diaphragm 35 driven by an iris driver 36. The lens L is controlled to setting values of the angle of view, the focusing point, and the exposure which are adopted for each photographic function, by a CPU 33 which receives the signal of the switch SW, that is, the switch (1) 31 shown in the drawing, and forms the image of the subject onto the CCD 41.

A CCD driver 51 is controlled by the CPU 33 based on the reference clock obtained by a timing generation circuit 52, and reads the subject image formed on the CCD 41 as an electric image signal. The image signal is read in a common video mode every 1/60 seconds, and accordingly, the shutter speed is set to 1/60 sec. When timing to sweep out unnecessary electrons is changed in the CCD having a shutter function, the shutter speed can be changed. Accordingly, when a sweep out control pulse of the CCD driver 51 is controlled by a CPU 33, even if the diaphragm 35 is fixed and an amount of exposure to the CCD 41 can not be controlled, appropriate exposure can be obtained by an AES function to the CCD driver 51.

An electric image signal which has been thus read out, is set to an appropriate AGC level in the AGC circuit 43 which is controlled by the CPU 33 through a CDS circuit 42, and enters into a matrix circuit 71.

Next, a luminance signal Y, and color difference signals B-Y and R-Y are obtained by the matrix circuit 71. In this example, the white balance is adjusted when levels of B and R are changed. These adjustments are controlled also by the CPU 33.

These luminance signal and color difference signal are signal-processed by a process circuit 81, which is controlled also by the CPU 33, and an encoder 82, and are outputted finally as a video signal.

A position of the video camera 10 is greatly different depending on whether the camera is placed in the mount P, or the camera is placed in the table for close-up photography. Accordingly, an acceleration sensor (weight sensor) is provided in the camera main body, and each photographic function can be switched by a position signal of the camera 10 outputted from the sensor.

A switch (0) is used for detecting the position signal. This signal is sent to the switch SW, and setting values, which are adapted for each photographic function, are switched by the control of the CPU 33.

Predetermined setting values are stored in the memory 32, and the setting values can be read out as necessary and new setting values can be also written in the memory. Accordingly, when a setting value is set by the foregoing operation, the camera can be switched to the setting value hereinafter.

Figure 9:
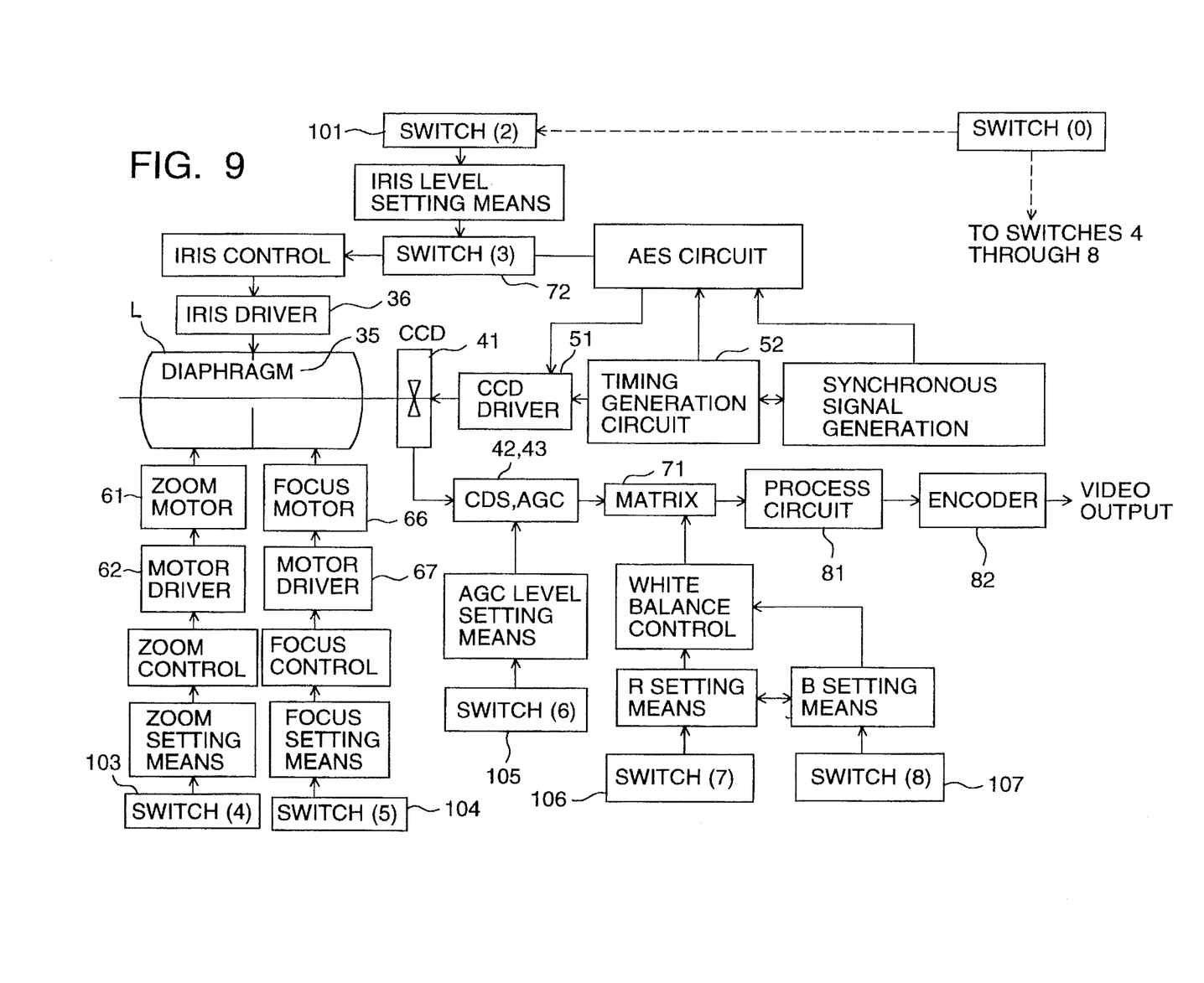
FIG. 9 is a block diagram showing the mode switching condition of photographic functions (No. 2).

FIG. 9 shows a system in which photographing functions are switched by independent adjusting means irrespective of the control of the CPU.

A switch (2) 101, and a switch (4) 103 to a switch (8) 107 are linked with the switch (0), and setting means (for example, voltage or the like) of the setting values are switched for each camera position. A switch (3) 72 is a switch to select whether the exposure adjustment is carried out by an iris control, or AES. Setting values can be switched for each camera position without depending on the CPU due to the switch (3) 72.

Next, the third example of the present invention will be explained as follows.

Figure 10:
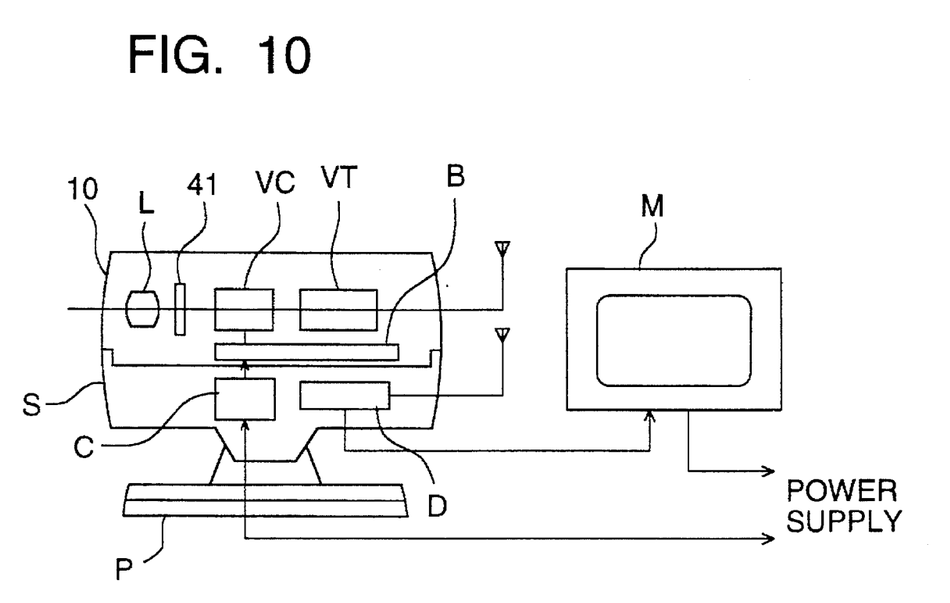
FIG. 10 is an illustration showing the structure of a cordless video camera.

As shown in FIG. 10, a chargeable battery B and a video transmitter VT are provided in a video camera 10 of the third example. A battery charger C to be connected with the power source and a decoder D to be connected with a monitor M are provided in the supporting base S of the mount P.

When the camera 10 is used under the condition that it is placed in the mount P, the power is supplied to the camera 10 by connecting the battery B with the battery charger C. The video signal outputted from a video circuit VC is transmitted from the video transmitter VT to the decoder D, and received by the monitor M as a video signal.

When the video camera 10 is used under the condition that it is separated from the mount P, the video signal is outputted from the video circuit VC by the power of the battery B which has been charged while the camera is placed in the mount. The video signal is transmitted from the video transmitter VT to the decoder D.

Accordingly, the camera 10 can be used as a so-called cord-less camera, and its operability can be greatly improved.

Further, the foregoing charging and transmitting/receiving functions can be also provided in the table for close-up photography 20 in addition to the foregoing mount P. Further, the decoder D may be separated from the mount and placed on the monitor side.

According to the present invention, the video camera can be simply and appropriately attached to and detached from the mount. Accordingly, a stationary compact type video camera can be used as a general purpose handy type camera. As a result, a video camera, which is used in various fields, highly operable, and effective, can be provided. Further, various adjustment functions are switched for each camera position, the video camera, in which an optimum image quality can be easily obtained as necessary, can be provided.

What is claimed is:

1. A video camera system comprising:
    (a) a video camera for photographing an image of a subject;
    (b) a supporting base;
    (c) a coupling for coupling said video camera to said supporting base whereby said video camera is releasably mounted thereon;
    (d) a trigger for generating a coupling signal when said video camera is coupled to said supporting base;
    (e) a memory for storing setting data; and
    (f) a control for setting said video camera to a rear light compensation mode in accordance with said setting data when said video camera is coupled to said supporting base, and in response to said coupling signal.

2. The video camera system of claim 1 further comprising:
    an acceleration sensor provided on said video camera for detecting an orientation position of said video camera and generating a position signal,
    wherein said control sets a rear light compensation mode according to said position signal.

3. The video camera system of claim 1 wherein said coupling includes a protrusion and an indent portion, said protrusion and indent portion being coupled to each other;
    wherein one of said protrusion and said indent portion is provided on said video camera, the other being provided on said supporting base; and
    wherein said trigger is connected to one of said protrusion and said indent portion which is provided on said camera, said trigger generating said coupling signal when said protrusion and said indent portion are coupled to each other.

4. A video camera system comprising:
    (a) a video camera for photographing an image of a subject;

(b) a supporting base;

(c) a coupling for coupling said video camera to said supporting base whereby said video camera is releasably mounted thereon;

(d) a trigger for generating a coupling signal when said video camera is coupled to said supporting base;

(e) a memory for storing setting data; and (f) a control for setting a white balance of said video camera to a specific value in accordance with said setting data when said video camera is coupled to said supporting base, and in response to said coupling signal.

5. The video camera system of claim 4 wherein said coupling includes a protrusion and an indent portion; said protrusion and indent portion being coupled to each other, wherein one of said protrusion and said indent portion is provided on said video camera, the other being provided on said supporting base, said trigger being connected to one of said protrusion and said indent portion which is provided on said camera, said trigger generating said coupling signal when said protrusion and said indent portion are coupled to each other.

6. The video camera system of claim 4 further comprising:

an acceleration sensor provided on said video camera for detecting an orientation position of said video camera and generating a position signal, wherein said control sets said white balance function of said video camera according to said position signal.

* * * * *